Figure 1:
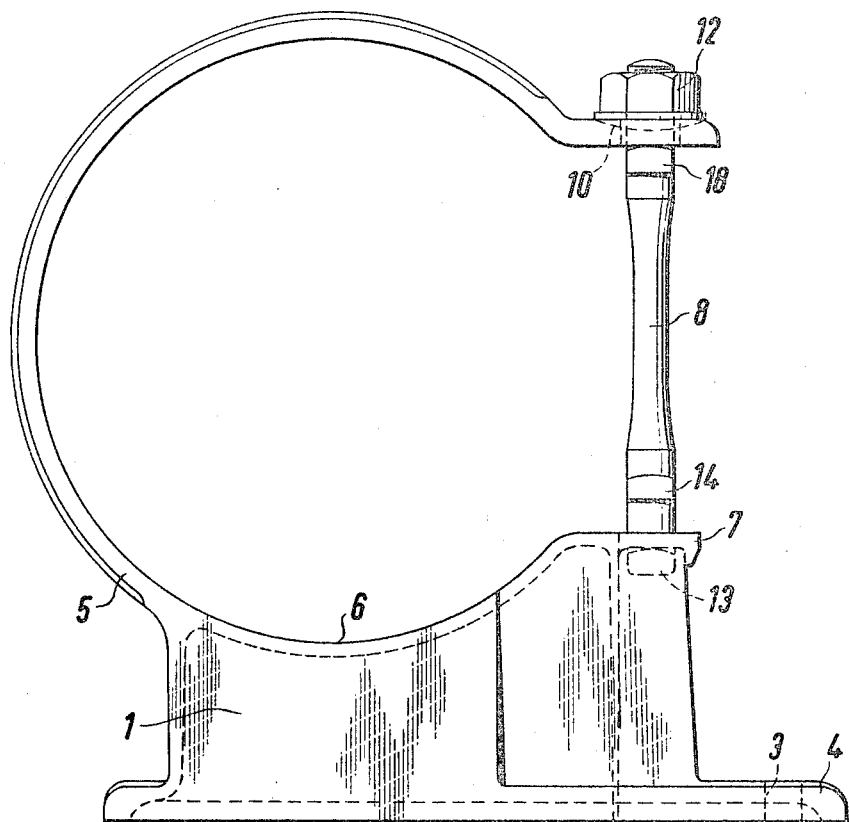

INVENTORS
VINCENT CHARLES WILLIAM JOYNER
THOMAS HENRY WEED
BY
Howson and Howson
THEIR ATTORNEYS Dec. 13, 1966   V. C. W. JOYNER ET AL   3,291,426
PIPE MOUNTING Filed Dec. 3, 1965   2 Sheets-Sheet 2

INVENTORS
VINCENT CHARLES WILLIAM JOYNER
THOMAS HENRY WEED
BY
Howson and Howson
THEIR ATTORNEYS ional to this invention a mounting for attaching
United States Patent Office 3,291,426
Patented Dec. 13, 1966

3,291,426
PIPE MOUNTING
Vincent Charles William Joyner, Doddinghurst, near Brentwood, Essex, and Thomas Henry Weed, Walthamstow, London, England, assignors to Celanese Building Components Limited, Glasgow, Scotland, a British company
Filed Dec. 3, 1965, Ser. No. 511,506
6 Claims. (Cl. 248—74)

This invention relates to pipe mountings and is concerned especially with mountings for holding soil and rainwater pipes on the walls of buildings.

Pipes, especially soil and rainwater pipes, are often joined by simple spigot and socket joints, the end of one pipe being fitted into an enlargement or socket formed on the end of another pipe. For mounting such pipes in position, for example on the wall of a building it may be necessary sometimes to provide a mounting at the enlargements or sockets and sometimes on the pipes themselves. In the case of pipes formed from thermoplastic synthetic polymeric materials or other materials having a high coefficient of expansion it is usual for expansion to be provided for at the spigot and socket joints, and for the socket parts to be held rigidly in their mountings whilst the mountings holding the pipes themselves permit the pipes to slide so as to take up thermal expansion or contraction.

According to this invention a mounting for attaching pipework onto a surface comprises a base capable of being secured to the surface and an open ended band, integral with the base, capable of encircling incompletely but throughout at least a major arc of the periphery thereof, a portion of the pipework to be mounted, and a separate closing device having near one end two longitudinally spaced abutments capable of selectively engaging one end of the band and tightening means adjacent its other end capable of engaging the other end of the band and of being tightened to a limited extent to clamp the band around a portion of the pipework.

The band can thus be arranged to fit around two different diameter parts of the pipework, for example around a pipe or around a socket, and by limiting the amount of tightening permitted it can be arranged to provide a tight or loose grip on the part selected.

If desired, of course, the closing device may have more than two abutments at its one end, providing for more than two mounting diameters.

Preferably the closing device is a screw threaded bolt having a co-operating nut, the length of screw threads on the bolt determining the degree by which it can be tightened and thus the limited extent of tightening of the band.

Preferably one end of the band is on the base of the mounting.

Figure 4:
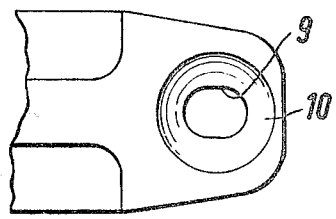
Figure 2:
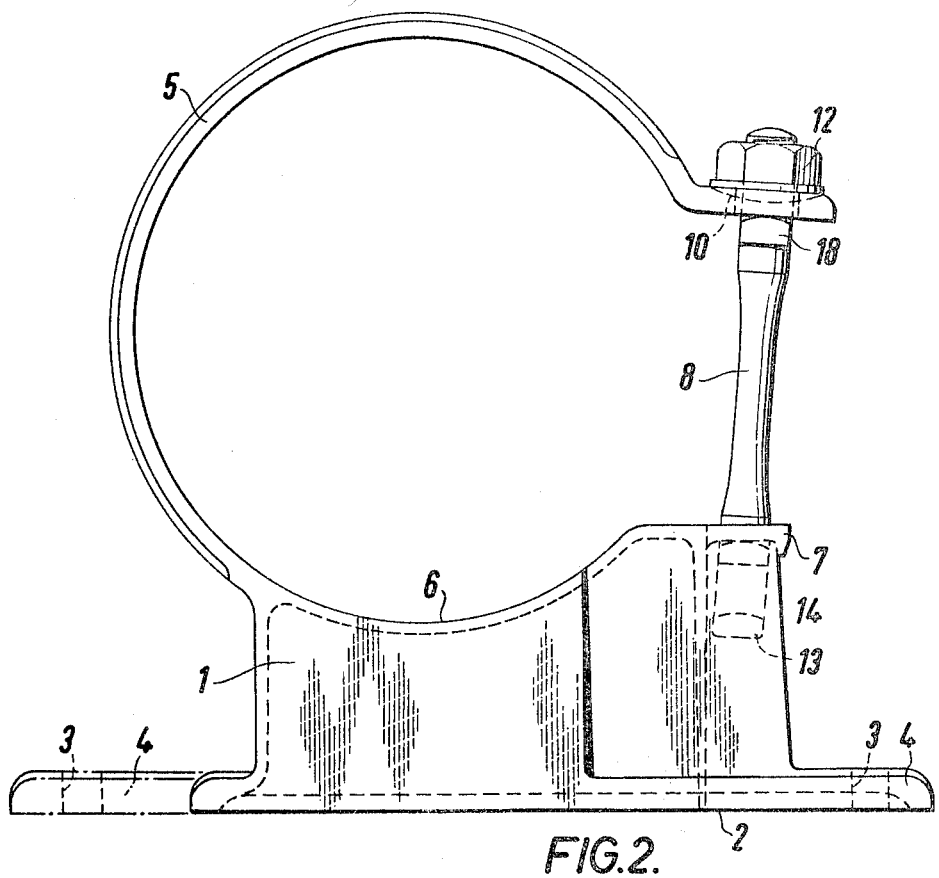
Figure 3:
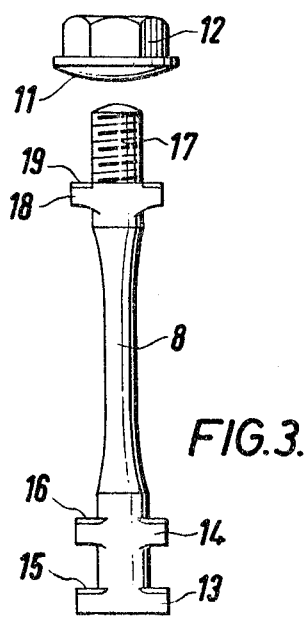

An embodiment of the invention is illustrated by way of example by the accompanying drawings, in which:

FIGURE 1 is an elevation of a pipe mounting showing the band with the bolt tightened in one position, FIGURE 2 is a similar view showing the bolt tightened in its alternative position, FIGURE 3 is an elevation of the bolt and nut of the pipe mounting of FIGURES 1 and 2, viewed in the direction of the arrow A of FIGURE 1, and FIGURE 4 is a fragmental plan showing the free end of the band alone.

The pipe mounting comprises a base 1 having a flat surface 2 and a screw hole in a lug 4 extending at one side by which it may be secured to a wall or like surface. If desired, as shown in chain dotted lines in FIGURE 2, two lugs 4 with screw holes 3 may be provided, one on each side of the base. Formed integrally with the base is a band 5 capable of partially encircling either a pipe or a socket of the pipework to be mounted. One end of the band is formed on the base, the surface of which opposite to the surface 2 is continuous with the inner surface of the band and forms a saddle 6 upon which the pipework will be supported. The main part of the band 5 projects from one side of the base 1 and from the opposite side projects the end part 7 of the band which is forked to provide a slot for receiving the closing bolt 8 as will be described. The surface of the forked end 7 is turned outwardly from the curved inner surface of the remainder of the band so as to stand clear of pipework around which the band is fitted. The other end of the band is likewise turned outwardly and has an elongated hole 9 (see FIGURE 4) for receiving the end of the bolt 8 and, on its outer surface, surrounding the hole 9, a part spherical recess 10 for engagement by the complementary part spherical surface 11 of a nut 12 by which the band is tightened. The depth of the slot in the forked end 7 and the position of the elongated hole 9 are such that the bolt 8, when extended between them will be clear of the surface of a pipe or socket encircled by the band. The base 1 and band 5 are conveniently formed integrally as a moulding in thermoplastic synthetic polymeric material such as acrylonitrile butadiene styrene copolymer and the bolt and nut are likewise preferably moulded in thermoplastic synthetic polymeric material.

The bolt 8, as shown in FIGURE 3, has at one end two spaced cross-pieces 13, 14 which can engage below the arms of the forked end 7 of the band. Their surfaces 15, 16, respectively, which are to engage the underside of the arms are curved so as to provide line contact when the bolt tilts on tightening. The longitudinal spacing between the two cross-pieces 13, 14 is such as to provide desired diameters of the band when tightened for engaging the pipework in the desired manner. In the embodiment illustrated, when the cross-piece 13 engages the forked end of the band as shown in FIGURE 1 and the nut 12 is tightened the band will clamp tightly around the socket part of pipework, but when the cross-piece 14 is engaged with the fork as shown in FIGURE 2 full tightening of the nut will reduce the diameter of the band only sufficiently to provide a loose grip on a pipe of the pipework, permitting the pipe to slide in the band.

The other end of the bolt 8 has a screw threaded portion 17 for passing through the hole 9 of the band and to receive the nut 12 and, at the inner end of the screw threaded portion a cross-piece 18 for engaging the inner surface of the free end of the band for limiting the amount by which the band can be tightened and providing for clamping of the free end of the band by the nut 12. Like the cross-pieces 13, 14 the cross-piece 18 has a curved surface 19 for providing line contact with the band at different angles of the bolt.

The single mounting shown can thus be used for securing a complete pipework system with rigid securing of the sockets and slidable retaining of the pipes. The positions of the two cross-pieces 13, 14 and of the cross-piece 18 are such that the nut 12 can be fully tightened in either position and will automatically give the desired tightness of the band, so that no skill is required in fixing the mountings. The single lug type of base shown in full line in the drawings is preferred, and can be used for vertical, inclined or horizontal pipework, in the latter case being arranged with the lug 4 uppermost, but for more secure fixing two lugs may be provided as described.

We claim:
1. A mounting for attaching pipework on to a surface comprising a base capable of being secured to the surface and an open ended band, integral with the base, capable of encircling incompletely but throughout at least a major arc of the periphery thereof, a portion of the pipework to be mounted, and a separate closing device having near one end two longitudinally spaced abutments for selectively engaging one end of the band and tightening means adjacent its other end for engaging the other end of the band and for being tightened to a limited extent to clamp the band around a portion of the pipework.

2. A mounting according to claim 1 wherein the closing device comprises a screw threaded bolt and a co-operating nut, the bolt being screw threaded throughout a length predetermined in order to provide the limited extent of tightening of the band.

3. A mounting according to claim 2 wherein the said other end of the band is forked to provide two spaced arms between which a portion of the bolt can fit and wherein the longitudinally spaced abutments each comprise a transverse bar extending on opposite sides of the bolt so as to engage below the arms at the end of the band when the bolt is received between the arms.

4. A mounting according to claim 1 wherein the closing device has more than two spaced abutments adjacent one end.

5. A mounting according to claim 1 wherein one end of the band is on the base of the mounting.

6. A mounting according to claim 1 which is moulded in a thermoplastic synthetic polymeric material.

References Cited by the Examiner
UNITED STATES PATENTS

| | | | |
|---|---|---|---|
| 1,568,101 | 1/1926 | Taylor | 248—230 |
| 2,191,579 | 12/1959 | Andreasen | 248—313 X |
| 3,167,286 | 1/1965 | Sherburne | 248—62 |

CLAUDE A. LE ROY, *Primary Examiner.*